United States Patent
Meier et al.

(10) Patent No.: US 7,042,865 B1
(45) Date of Patent: May 9, 2006

(54) AUTOMATED IP MULTICAST FILTERING

(75) Inventors: Robert C. Meier, Cuyahoga Falls, OH (US); Victor J. Griswold, North Canton, OH (US); Liwen Wu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 788 days.

(21) Appl. No.: 09/992,461

(22) Filed: Nov. 16, 2001

(51) Int. Cl.
*H04Q 7/24* (2006.01)
(52) U.S. Cl. .................................. 370/338; 370/390
(58) Field of Classification Search ............... 370/338, 370/389, 390, 392, 400, 401, 432; 709/238, 709/245, 223
See application file for complete search history.

(56) References Cited

U.S. PATENT DOCUMENTS

| | | | |
|---|---|---|---|
| 6,195,705 B1 * | 2/2001 | Leung | 709/245 |
| 6,532,233 B1 * | 3/2003 | Matsunaga et al. | 370/390 |
| 6,754,197 B1 * | 6/2004 | Davidson et al. | 370/338 |
| 2002/0046271 A1 * | 4/2002 | Huang | 709/223 |
| 2005/0025160 A1 * | 2/2005 | Meier et al. | 370/395.53 |

* cited by examiner

*Primary Examiner*—Duc Ho
*Assistant Examiner*—Phuongchau Ba Nguyen
(74) *Attorney, Agent, or Firm*—Tucker Ellis & West LLP

(57) ABSTRACT

A method and system of selective data transmission is disclosed. A plurality of data packets are transmitted wherein at least a portion of the data packets have one or more predetermined identifiers. The data packets having the predetermined identifier are selected and forwarded to a desired recipient.

41 Claims, 3 Drawing Sheets

| RECIP. 42 | ID 44 | TIME 46 | ... |
|---|---|---|---|
| 1 | X | A | ... |
| 2 | X | B | ... |
| 3 | X | C | ... |
| 4 | X | D | ... |
| ⋮ | ⋮ | ⋮ | |

AUTOMATED IP MULTICAST FILTERING

BACKGROUND OF THE INVENTION

The present invention is directed to the field of network communications, particularly those of the type conducted over a wireless local area network (WLAN). Multicasting is widely used to send transmissions to a select group of recipients. IP multicasting allows a single set of packets to be transmitted to a plurality of recipients over the Internet, unlike typical Internet transmissions in which a source connects to a single recipient destination. IP multicast applications such as streaming audio/video multicasts are becoming increasingly widespread. As a consequence, the volume of IP multicast traffic is increasing.

By default, all multicast traffic is distributed throughout a local area network (LAN). However, multicast transmissions can be especially problematic when used in WLANs that provide wireless access in accordance with the IEEE 802.11 standards. Due to the network architecture of a WLAN, multicast transmissions are forwarded by a wireless "access point" to a "client", i.e. a user station, through the air via radio frequency transmission. Since multicast transmissions are forwarded by a plurality of 802.11 access points, they therefore consume more wireless bandwidth than single data stream unicast transmissions.

A wireless access point under the IEEE 802.11 protocol is typically connected to a high-speed Ethernet link having a bandwidth of 100 Mbps (megabits per second). However, due to certain limitations in wireless transmission, an 802.11 access point operates at a much lower bandwidth, typically about 2–11 Mbps. Consequently, multicast transmissions are typically rate-limited to control the amount of bandwidth consumed for multicast traffic. However, such rate-limiting creates problems in transmission that can create errors.

Select packets from the wired network have a destination multicast address enabled by an 802.11 station. Such packets are deemed "useful" by the access point, and packets lacking such an enabled address are deemed "useless." If simple rate limiting is used to restrict the amount of multicast traffic on 802.11 links by the access point, it may happen that both "useless" and "useful" packets may be discarded. This can result in signal dropouts in the multicast transmissions, or even a complete transmission failure, resulting in inconvenience and dissatisfaction on the part of the network user.

SUMMARY OF THE INVENTION

In view of the difficulties and drawbacks encountered in previous-type systems, there is therefore a need for a method and system that would determine whether multicast packets are "useful" or "useless."

There is also a need for a method and system that generally improves wireless bandwidth utilization efficiency.

There is also a need for a method and system that can be implemented without enhancement or changes to existing systems.

These needs and others are satisfied by the method and system of selective data transmission, according to the present invention. A plurality of data packets are transmitted wherein at least a portion of the data packets have one or more predetermined identifiers. The data packets having the predetermined identifier are selected and forwarded to a desired recipient or group of recipients.

As will be realized, the invention is capable of other and different embodiments and its several details are capable of modifications in various respects, all without departing from the invention. Accordingly, the drawing and description are to be regarded as illustrative and not restrictive.

BRIEF DESCRIPTION OF THE DRAWINGS

FIG. 3 depicts a membership table in accordance with the present invention.

DETAILED DESCRIPTION OF THE INVENTION

Figure 1:
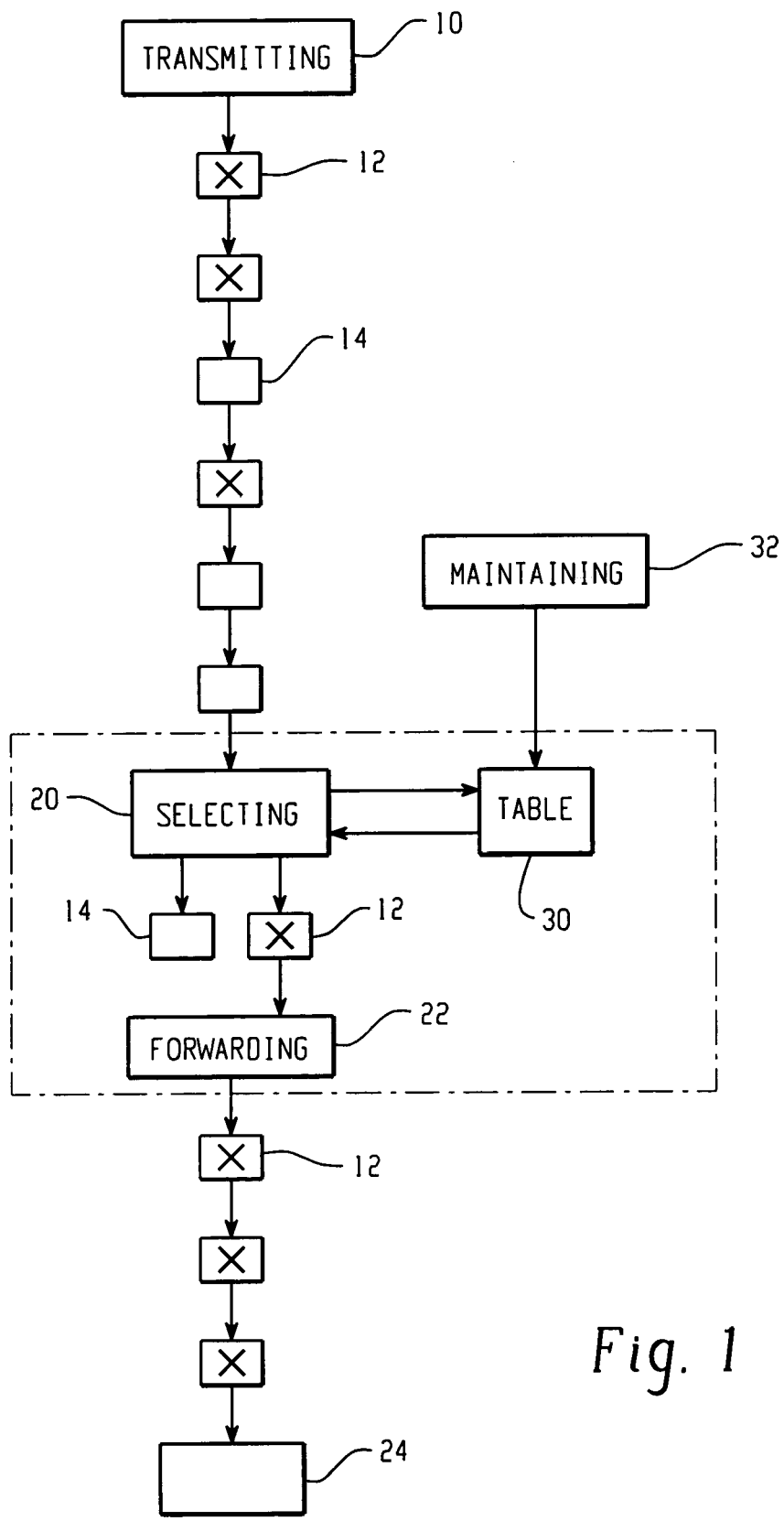
FIG. 1 is a flow chart generally depicting the steps of the method of the present invention.
Figure 2:
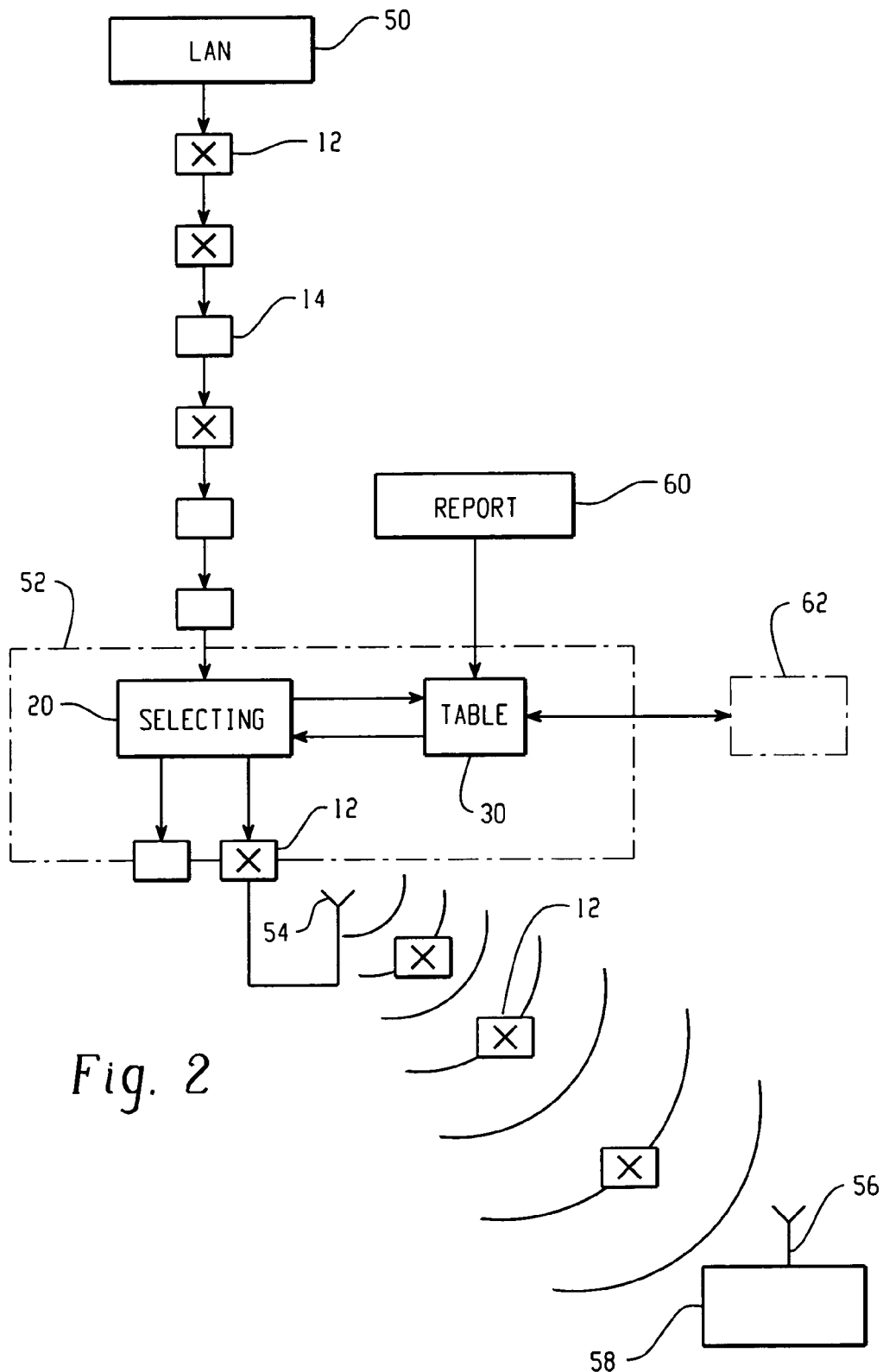
FIG. 2 is a block diagram generally depicting an apparatus in accordance with a preferred embodiment of the present invention.

FIGS. 1 and 2 generally depict the method and apparatus according to a preferred embodiment of the present invention. The present method includes the step of transmitting 10 a plurality of data packets. At least a portion of the data packets are packets 12 having a predetermined identifier, as will be set forth in detail below. The remainder of the data packets are packets 14 not having the predetermined identifier. In the preferred embodiment, as shown in FIG. 2, the packets 12, 14 are transmitted over a local area network 50 to a wireless access point 52, for subsequent forwarding. After the step of transmitting, a step is performed of selecting the data packets 12 having the predetermined identifiers. The selected packets 12 are then forwarded to a recipient 24. In the preferred embodiment shown in FIG. 2, the selected packets 12 are forwarded from the wireless access point 52 using an antenna 54 to send a wireless transmission that is received on an antenna 56 of a mobile client 58 or other similar-type recipient 24.

As shown in FIG. 1, the step of selecting 20 includes a step of comparing the data packets 12, 14 with a membership table 30 for tabulating each predetermined identifier respectively associated with each of the recipients 24. Any data packets 14 not having a predetermined identifier included in the membership table 30 are discarded so as to give priority to the identified throughput. It should be understood that, except insofar as specifically stipulated, the means for selecting and the membership table and any other functional implementation can be realized as software, firmware, hardware or any combination thereof, and can reside within the access point 52 or other implementation, or be a separate component, all without departing from the invention.

In the preferred embodiment, the identified data packets 12 are multicast packets each having a multicast address in conformity with the IEEE 802 protocols. IP multicast addresses (i.e. Class D addressed) map directly to 48-bit addresses under the IEEE 802 standards (i.e. Ethernet or 802.11 wireless protocols). The low-order 23 bits of the IP address are used as the low-order 23 bits of the corresponding 802 address. The high-order 24 bits of an 802 address contain an "Organization Unique Identifier" or OUI. (The low-order and high-order bits are separated by an unused bit that always has the value of "zero.") The OUI of an 802 address that corresponds to a Class D IP multicast address is hexadecimal 01005E. Any IEEE 802 packet having this multicast address corresponds to an IP multicast address. It should be noted that a number of IP addresses can map to a single 802 multicast address.

In the preferred embodiments, an access point 52 can employ the present method to determine the set of group IP addresses that are active on its wireless 802.11 links, in order to intelligently "filter" the packets. In so doing, the access point 52 can reliably and automatically determine which IP multicast packets are "useful" so as to discard the "useless" IP multicast packets without inadvertently discarding "useful" packets.

The present invention can be implemented to provide an 802 multicast address filter. The access point 52 maintains a membership table 30 for multicast addresses for each station or recipient that accesses the network via its 802.11 link (either directly or indirectly via another wireless access point). In accordance with the defined multicast registration protocol, IP hosts must register to participate in an IP multicast group by sending an IGMP (Internet Group Management Protocol) "membership report" message, as defined in RFC 2236. The access point 52 monitors the IGMP reports periodically received from stations on its 802.11 link. The IGMP report is a membership report 60 that is used in a step of maintaining 32 the membership table 30.

Figure 3:
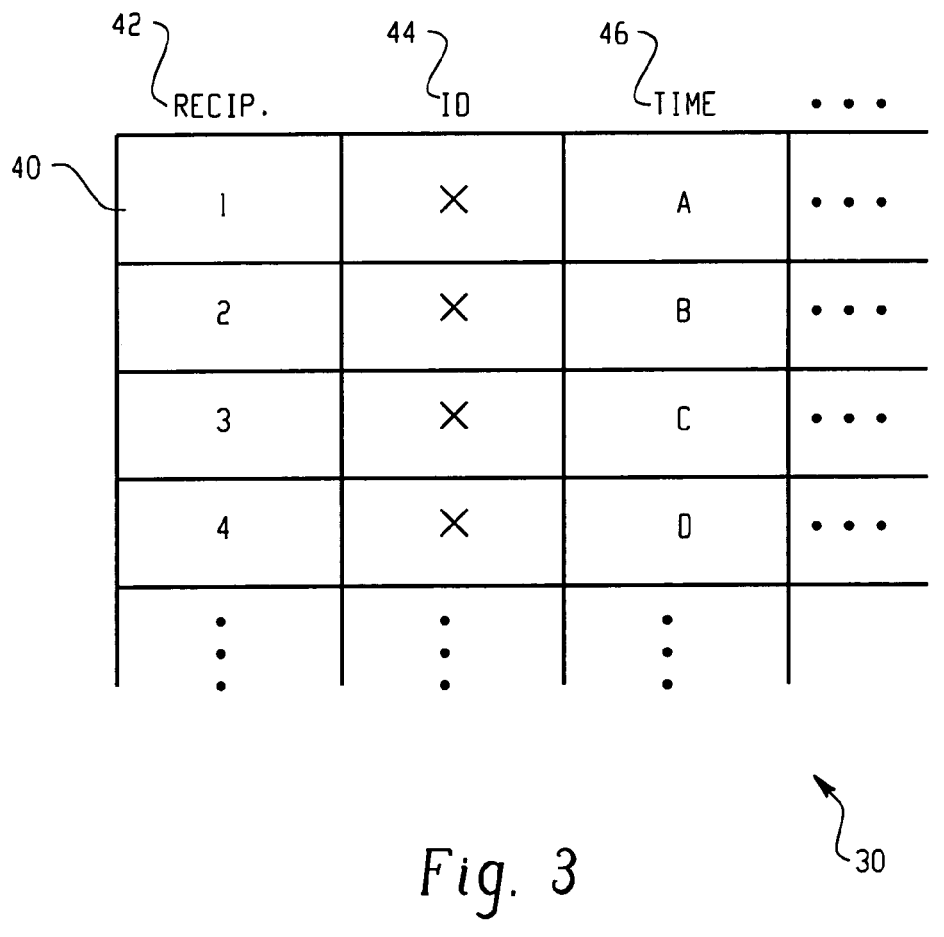

As shown in FIG. 3, the membership table 30 includes an entry 40 for each multicast address of an associated station. Each entry 40 includes a plurality of fields. Each entry 40 can also include an ID field 44 for indicating the predetermined identifier, which can be the 802 multicast address that corresponds to a respective IP address in an IGMP report received from a station or other recipient 24 on the access point's 802.11 link. Of course, it is to be understood that any other identifier could also be used without departing from the invention. Each entry in the table 30 can also include an "age" field 46 that corresponds to a received time when a membership report was received from the respective station for the corresponding address. An entry 40 is discarded if and when a new IGMP membership report is not received within a threshold time period, e.g. a period greater than the maximum allotted interval between IGMP reports for the respective address. This indicates that a member of the multicast group is no longer associated with the access point 52. Other fields can be added to the entry 40 to satisfy any particular needs.

As set forth above, the membership table 30 maintains identifier information for associated recipients 24. In this way, the identifier field 44 for each entry is correlated with the "destination" of the selected data packets 12. This information can also be maintained in a separate table, maintained on the access point, the network, or in another location. To this end, the membership table 30 maintained on the access point 52 can also comprise an "active multicast address table" that contains the 802 multicast addresses that are active on the link. This active table contains an entry or field for each address in the membership table 30. An AP 52 will not forward a multicast frame having an OUI equal to hexadecimal 01005E, in an "outbound" direction on the link unless its multicast destination corresponds with an authorized recipient 24 indicated as active over the link. For example, if an AP 52 receives a multicast from over its Ethernet link to the LAN 50, it will first check the OUI. If the OUI is 01005E, then the access point 52 will determine if the destination address is on its "active table." If it is not, the frame is not forwarded over the AP's 802.11 link.

As wireless clients "roam" between access points, the multicast membership table 30 and all its respective entries can be transferred from an "old parent access point" to a "new parent access point" 62. In this event the new parent AP 62 updates its "active" multicast table to reflect the newly-associated station's multicast membership. The "old parent AP" would then delete the respective entry for that station. It may not always be possible to transfer group membership information from the "old AP" to the "new AP" when a station roams. In that case, the new AP can send an IGMP "general query" message to a station when it first roams to the new AP. An IGMP query is used to solicit IGMP membership report messages from the station. The solicited IGMP report messages update the group membership information in the new AP and update group membership information in any associated Ethernet bridges and switches in the path to the station. It should be noted that with the present invention, Ethernet switches may also implement "IGMP snooping" by "sniffing" IGMP messages received on a switch port. Simple IGMP snooping will not work correctly in such a switch, because a roaming cleint will not transmit IGMP reports each time it roams into an AP in a "new switch ort." The problem can be resolved if a new parent AP sends an IGMP general query to reestablish group membership information in both the AP and the switch. Also, a new parent AP may generate "proxy IGMP membership report" messages for a station, when the station first roams to the AP, to update group membership information in any Ethernet bridges or switches that use IGMP snooping on the path to the station. It should also be noted that the "age" of group membership is also transferred when a client roams to a new AP.

An "active" entry is deleted when the number of stations associated with a given active multicast address reaches zero. The active entry count is decremented when a station in the multicast group roams to a different AP. An entry is also "aged" and discarded if a new IGMP membership report is not received within some time period.

The present method offers certain benefits over a previous-type statistically configured filter. With the present method, the network manager does need advance notice of all multicast addresses that may be used. Also, the addresses need to be enabled only for the period they are in use. This improves efficiency by removing uncertainty. Also, the present solution does not require enhancements or changes to an existing 802.11 client or other recipient. The present solution also distinguishes between types of IP multicast frames. A standard membership registration protocol is used to define membership information, to distinguish between multicast frames where the membership is not known.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A method of selective data transmission comprising:
   transmitting a plurality of data packets wherein at least a portion of the data packets have at least one predetermined identifier;
   selecting the data packets having the predetermined identifier, wherein the selecting comprises comparing the data packets with a membership table for selecting each predetermined identifier respectively associated with each of the at least one recipients, and discarding data packets not having a predetermined identifier included in the membership table, so as to give priority to identified data packets; the membership table selects identified data packets that are multicast destination packets each having a multicast destination address under at least one of IEEE 802 and Class D IP protocols;

forwarding the selected data packets to at least one recipient; and transferring membership table information from a first wireless access point to a second wireless access point when the at least one recipient roams between respective access points, the step of transferring comprises issuing a general query from the at least one recipient to the second wireless access point, for soliciting membership report messages from the second wireless access point;

wherein the membership table is maintained on a wireless access point for forwarding the identified data packets to the at least one recipient.

2. The method of claim 1 wherein the step of transmitting comprises sending the data packets over a local area network to an access point, and wherein the step of forwarding comprises wireless transmission of the identified data packets from the access point to the recipient.

3. The method of claim 1 wherein the solicited report messages are used to update membership table information on the second wireless access point.

4. The method of claim 1 wherein the solicited report messages are used to update membership table information on associated Ethernet bridges and switches.

5. The method of claim 1 wherein the step of transferring comprises IGMP snooping on associated Ethernet bridges and switches.

6. The method of claim 5 wherein the second wireless access point generates a proxy IGMP membership message to the at least one recipient to update membership table information.

7. The method of claim 1 further comprising a step of maintaining the membership table by periodically receiving a membership report from each of the at least one recipients.

8. The method of claim 7 wherein the step of maintaining the membership table comprises maintaining an entry comprising a plurality of fields for each of the at least one recipients, wherein one of the fields comprises the predetermined identifier.

9. The method of claim 8 wherein another of the plurality of fields comprises an age field corresponding to a received time of a received time of a membership report and wherein the entry is discarded when a new membership report is not received within a threshold time period.

10. The method of claim 1 wherein the predetermined identifier is correlated with the source of the data packet.

11. The method of claim 1 wherein the predetermined identifier is correlated with the destination of the data packet.

12. A method of selective data transmission comprising:

transmitting a plurality of data packets wherein at least a portion of the data packets have at least one predetermined identifier;

selecting the data packets having the predetermined identifier, the step of selecting comprises comparing the data packets with a membership table for selecting each predetermined identifier respectively associated with each of the at least one recipients, and discarding data packets not having a predetermined identifier included in the membership table, so as to give priority to identified data packets;

forwarding the selected data packets to at least one recipient;

transferring membership table information from a first wireless access point to a second wireless access point when the at least one recipient roams between respective access points, wherein the transferring comprises IGMP snooping on associated Ethernet bridges and switches;

wherein the membership table is maintained on a wireless access point for forwarding the identified data packets to the at least one recipient; and wherein the second wireless access point generates a proxy IGMP membership message to the at least one recipient to update membership table information.

13. The method of claim 12 wherein the step of transmitting comprises sending the data packets over a local area network to an access point, and wherein the step of forwarding comprises wireless transmission of the identified data packets from the access point to the recipient.

14. The method of claim 12 wherein the membership table selects identified data packets that are multicast destination packets each having a multicast destination address under at least one of IEEE 802 and Class D IP protocols.

15. The method of claim 14 wherein the step of transferring comprises issuing a general query from the at least one recipient to the second wireless access point, for soliciting membership report messages from the second wireless access point.

16. The method of claim 15 wherein the solicited report messages are used to update membership table information on the second wireless access point.

17. The method of claim 15 wherein the solicited report messages are used to update membership table information on associated Ethernet bridges and switches.

18. The method of claim 12 further comprising a step of maintaining the membership table by periodically receiving a membership report from each of the at least one recipients.

19. The method of claim 18 wherein the step of maintaining the membership table comprises maintaining an entry comprising a plurality of fields for each of the at least one recipients, wherein one of the fields comprises the predetermined identifier.

20. The method of claim 19 wherein another of the plurality of fields comprises an age field corresponding to a received time of a received time of a membership report and wherein the entry is discarded when a new membership report is not received within a threshold time period.

21. The method of claim 12 wherein the predetermined identifier is correlated with one of the group consisting of the source of the data packet and the destination of the data packet.

22. An apparatus for selective data transmission comprising:

means for transmitting a plurality of data packets wherein at least a portion of the data packets have at least one predetermined identifier;

means for selecting the data packets having the predetermined identifier, the means for selecting comprises means for comparing the data packets with a membership table for selecting each predetermined identifier respectively associated with each of the at least one recipients, and means for discarding data packets not having a predetermined identifier included in the membership table, so as to give priority to identified data packets;

means for forwarding the selected data packets to at least one recipient; and means for transferring membership table information from a first wireless access point to a second wireless access point when the at least one recipient roams between respective access points, the means for transferring comprises means for issuing a general query from the at least one recipient to the second wireless access point, for soliciting membership report messages from the second wireless access point;

wherein the membership table is maintained on a wireless access point for forwarding the identified data packets to the at least one recipient.

23. The apparatus of claim 22 wherein the means for transmitting comprises a local area network for sending the data packets to the means for forwarding, and wherein the means for forwarding comprises an access point for wireless transmission of the identified data packets to the recipient.

24. The apparatus of claim 22 wherein the membership table selects identified data packets that are multicast packets each having a multicast destination address under at least one of IEEE 802 and Class D IP protocols.

25. The apparatus of claim 22 wherein the solicited report messages are used to update membership table information on the second wireless access point.

26. The apparatus of claim 22 wherein the solicited report messages are used to update membership table information on associated Ethernet bridges and switches.

27. The apparatus of claim 22 wherein the means for transferring comprises means for IGMP snooping on associated Ethernet bridges and switches.

28. The apparatus of claim 27 wherein the second wireless access point generates a proxy IGMP membership message to the at least one recipient to update membership table information.

29. The apparatus of claim 22 further comprising means for maintaining the membership table with periodically received membership reports from each of the at least one recipients.

30. The apparatus of claim 29 wherein the means for maintaining the membership table comprises means for maintaining an entry comprising a plurality of fields for each of the at least one recipients, wherein one of the fields comprises the predetermined identifier.

31. The apparatus of claim 29 wherein another of the plurality of fields comprises an age field corresponding to a received time of a membership report and wherein the entry is discarded when a new membership report is not received within a threshold time period.

32. The apparatus of claim 22 wherein the predetermined identifier is correlated with one of the group consisting of the source of the data packet and the destination of the data packet.

33. An apparatus for selective data transmission comprising:

means for transmitting a plurality of data packets wherein at least a portion of the data packets have at least one predetermined identifier;

means for selecting the data packets having the predetermined identifier, the means for selecting comprises means for comparing the data packets with a membership table for selecting each predetermined identifier respectively associated with each of the at least one recipients, and means for discarding data packets not having a predetermined identifier included in the membership table, so as to give priority to identified data packets; and means for forwarding the selected data packets to at least one recipient;

means for transferring membership table information from a first wireless access point to a second wireless access point when the at least one recipient roams between respective access points, the means for transferring comprises means for IGMP snooping on associated Ethernet bridges and switches;

wherein the membership table is maintained on a wireless access point for forwarding the identified data packets to the at least one recipient; and wherein the second wireless access point generates a proxy IGMP membership message to the at least one recipient to update membership table information.

34. The apparatus of claim 33 wherein the membership table selects identified data packets that are multicast packets each having a multicast destination address under at least one of IEEE 802 and Class D IP protocols.

35. The apparatus of claim 33 wherein the means for transferring comprises means for issuing a general query from the at least one recipient to the second wireless access point, for soliciting membership report messages from the second wireless access point.

36. The apparatus of claim 35 wherein the solicited report messages are used to update membership table information on the second wireless access point.

37. The apparatus of claim 35 wherein the solicited report messages are used to update membership table information on associated Ethernet bridges and switches.

38. The apparatus of claim 33 further comprising means for maintaining the membership table with periodically received membership reports from each of the at least one recipients.

39. The apparatus of claim 38 wherein the means for maintaining the membership table comprises means for maintaining an entry comprising a plurality of fields for each of the at least one recipients, wherein one of the fields comprises the predetermined identifier.

40. The apparatus of claim 39 wherein another of the plurality of fields comprises an age field corresponding to a received time of a membership report and wherein the entry is discarded when a new membership report is not received within a threshold time period.

41. The apparatus of claim 33 wherein the predetermined identifier is correlated with one of the group consisting of the source of the data packet and the destination of the data packet.

* * * * *